(12) United States Patent
Cronin et al.

(10) Patent No.: US 8,589,761 B2
(45) Date of Patent: Nov. 19, 2013

(54) APPARATUS AND METHODS FOR PROVIDING DATA INTEGRITY

(75) Inventors: Terry Cronin, Ham Lake, MN (US); Joseph M. Jeddeloh, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 352 days.

(21) Appl. No.: 13/149,488

(22) Filed: May 31, 2011

(65) Prior Publication Data

US 2012/0311388 A1  Dec. 6, 2012

(51) Int. Cl.
G11C 29/42 (2006.01)
G11C 29/54 (2006.01)

(52) U.S. Cl.
USPC .......................... 714/763; 714/758; 707/687

(58) Field of Classification Search
None
See application file for complete search history.

(56) References Cited

U.S. PATENT DOCUMENTS

| 7,315,976 B2* | 1/2008 | Holt .............................. 714/769 |
| 2004/0123032 A1* | 6/2004 | Talagala et al. ............... 711/114 |
| 2004/0153746 A1 | 8/2004 | Talagala et al. |
| 2006/0075287 A1 | 4/2006 | Vageline et al. |
| 2008/0086615 A1* | 4/2008 | Elliott et al. .................. 711/165 |
| 2008/0163028 A1 | 7/2008 | Mokhlesi |
| 2009/0083504 A1* | 3/2009 | Belluomini et al. .......... 711/162 |
| 2010/0050053 A1 | 2/2010 | Wilson et al. |

OTHER PUBLICATIONS

U.S. Appl. No. 13/149,447, filed May 31, 2011 (40 pages).
U.S. Appl. No. 13/149,467, filed May 31, 2011 (39 pages).
U.S. Appl. No. 13/149,461, filed May 31, 2011 (41 pages).
U.S. Appl. No. 13/149,457, filed May 31, 2011 (41 pages).
U.S. Appl. No. 13/149,498, filed May 31, 2011 (40 pages).
U.S. Appl. No. 13/149,518, filed May 31, 2011 (42 pages).
International Search Report and Written Opinion for related PCT Application No. PCT/US2012/039851, mailed Nov. 30, 2012, (9 pgs).

* cited by examiner

*Primary Examiner* — Ajay Bhatia
*Assistant Examiner* — Dipakkumar Gandhi
(74) *Attorney, Agent, or Firm* — Brooks, Cameron & Huebsch PLLC (57) ABSTRACT

The present disclosure includes apparatus (e.g., computing systems, memory systems, controllers, etc.) and methods for providing data integrity. One or more methods can include, for example: receiving a number of sectors of data to be written to a number of memory devices; appending first metadata corresponding to the number of sectors and including first integrity data to the number of sectors, the first metadata has a particular format; generating second integrity data to be provided in second metadata, the second integrity data corresponding to at least one of the number of sectors (wherein the second metadata has a second format); and generating third integrity data to be provided in the second metadata, the third integrity data including error data corresponding to the second integrity data and the at least one of the number of sectors.

30 Claims, 5 Drawing Sheets

APPARATUS AND METHODS FOR PROVIDING DATA INTEGRITY

TECHNICAL FIELD

The present disclosure relates generally to semiconductor memory devices, methods, and systems, and more particularly, to apparatus and methods for providing data integrity.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory devices can be combined together to form a storage volume of a memory system such as a solid state drive (SSD). A solid state drive can include non-volatile memory, e.g., NAND flash memory and NOR flash memory, and/or can include volatile memory, e.g., DRAM and SRAM, among various other types of non-volatile and volatile memory. Flash memory devices, including floating gate flash devices and charge trap flash (CTF) devices using semiconductor-oxide-nitride-oxide-semiconductor and metal-oxide-nitride-oxide-semiconductor capacitor structures that store data in charge traps in the nitride layer, may be utilized as non-volatile memory for a wide range of electronic applications. Flash memory devices typically use a one-transistor memory cell that allows for high memory densities, high reliability, and low power consumption.

An SSD can be used to replace hard disk drives as the main storage device for a computer, as the solid state drive can have advantages over hard drives in terms of performance, size, weight, ruggedness, operating temperature range, and power consumption. For example, SSDs can have superior performance when compared to magnetic disk drives due to their lack of moving parts, which may avoid seek time, latency, and other electro-mechanical delays associated with magnetic disk drives. SSD manufacturers can use non-volatile flash memory to create flash SSDs that may not use an internal battery supply, thus allowing the drive to be more versatile and compact.

An SSD can include a number of memory devices, e.g., a number of memory chips. A memory device can include a number of dies and/or logical units (LUNs). Each die can include a number of memory arrays and peripheral circuitry thereon, and the memory arrays can include a number of blocks of memory cells organized into a number of physical pages.

An SSD can receive commands from a host in association with memory operations such as read and write operations to transfer data (e.g., user data and associated integrity data such as error data and address data, etc.) between the memory devices and the host. It can be beneficial to provide end-to-end integrity of the data transferred between the memory devices and the host in association with such operations in order to provide confidence that the data has not been corrupted during the transfer, for instance.

DETAILED DESCRIPTION

The present disclosure includes apparatus (e.g., computing systems, memory systems, controllers, etc.) and methods for providing data integrity. One or more method embodiments can include, for example: receiving a number of sectors of data to be written to a number of memory devices (e.g., a single memory device); appending first metadata corresponding to the number of sectors and including first integrity data to the number of sectors, the first metadata has a particular format; generating second integrity data to be provided in second metadata, the second integrity data corresponding to at least one of the number of sectors (wherein the second metadata has a second format); and generating third integrity data to be provided in the second metadata, the third integrity data including error data corresponding to the second integrity data and the at least one of the number of sectors.

One or more embodiments of the present disclosure provide a flexible architecture for providing end-to-end data integrity within a memory system, for example. For instance, one or more embodiments can perform a metadata format conversion, which can provide the ability to adapt to different page sizes and or available metadata sizes associated with different types of memory devices, among other benefits. One or more embodiments include a controller that can perform error recovery operations while maintaining data integrity in accordance with embodiments described herein, which can provide benefits such as reducing the amount of device manufacturing testing that is done (e.g., testing performed pre-shipping prior to being provided to a consumer in the field), among other benefits.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designator "N," particularly with respect to reference numerals in the drawings, indicates that a number of the particular feature so designated can be included with one or more embodiments of the present disclosure. As used herein, "a number of" something can refer to one or more of such things (e.g., a number of memory devices can refer to one or more memory devices).

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 208 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present invention, and should not be taken in a limiting sense.

Figure 1:
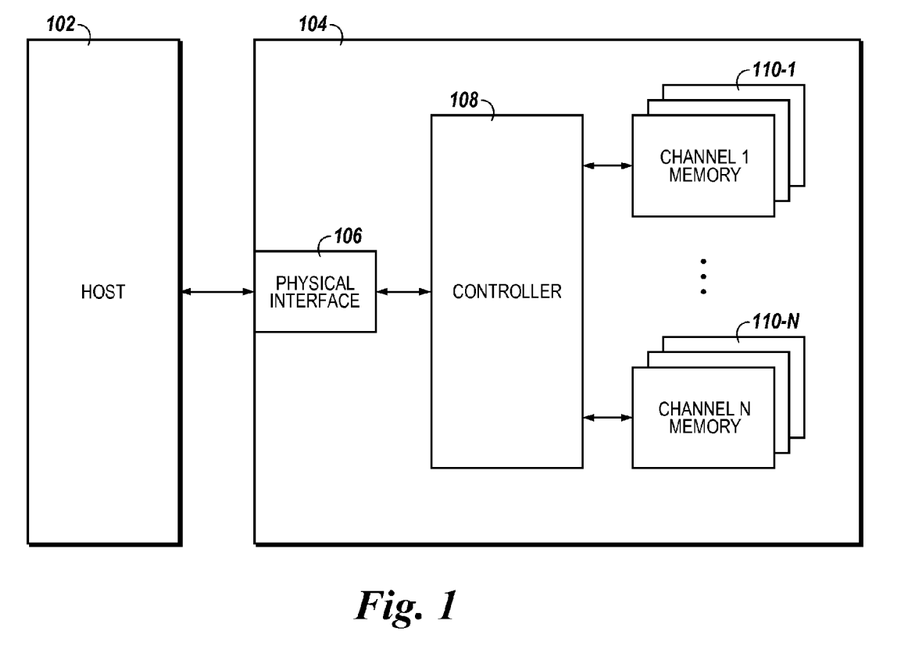
FIG. 1 is a functional block diagram of a computing system including at least one memory system in accordance with one or more embodiments of the present disclosure.

FIG. 1 is a functional block diagram of a computing system 100 including at least one memory system 104 in accordance with one or more embodiments of the present disclosure. The memory system 104 can be a solid state drive (SSD), for instance, and can include a physical host interface 106, a memory system controller 108 (e.g., a processor and/or other control circuitry), and one or more memory devices 110-1, ..., 110-N (e.g., solid state memory devices such as NAND flash devices), which provide a storage volume for the memory system 104.

As illustrated in FIG. 1, the physical host interface 106 is coupled to the controller 108 and can be used to communicate data between the memory system 104 and a host 102. The interface 106 can be in the form of a standardized interface. For example, when the memory system 104 is used for data storage in a computing system 100, the physical host interface 106 can be a serial advanced technology attachment (SATA), peripheral component interconnect express (PCIe), or a universal serial bus (USB), among other connectors and interfaces. In general, however, physical host interface 106 can provide an interface for passing control, address, data, and other signals between the memory system 104 and a host 102 having compatible receptors for the physical host interface 106.

Host 102 can be a host system such as a personal laptop computer, a desktop computer, a digital camera, a mobile telephone, or a memory card reader, among various other types of hosts. Host 102 can include a system motherboard and/or backplane and can include a memory access device (e.g., a number of processors).

The controller 108 can communicate with the memory devices 110-1, ..., 110-N to read, write, and erase data, among other operations. The controller 108 can be, for example, circuitry and/or firmware that may include a number of components (e.g., one or more integrated circuits). For example, the controller 108 can include control circuitry for controlling access across the memory devices 110-1, ..., 110-N and circuitry for providing a translation layer between host 102 and the memory system 104. Thus, the memory controller 108 could selectively couple an I/O connection (not shown in FIG. 1) of a memory device 110-1, ..., 110-N to receive the appropriate signal at the appropriate I/O connection at the appropriate time. Similarly, the communication protocol between the host 102 and the memory system 104 may be different than what is used to access a memory device 110-1, ..., 110-N. Controller 108 could then translate the commands received from the host 102 into the appropriate commands to achieve the desired access to the number of memory devices 110-1, ..., 110-N.

The memory devices 110-1, ..., 110-N can include one or more arrays of memory cells (e.g., non-volatile memory cells). The arrays can be flash arrays with a NAND architecture, for example. However, embodiments are not limited to a particular type of memory array or array architecture.

The memory devices 110-1, ..., 110-N can include a number of memory cells that can be grouped, for instance, into a number of blocks including a number of physical pages. A number of blocks can be included in a plane of memory cells and an array can include a number of planes. As one example, a memory device may include 4320 bytes (B) of data per page, 128 pages per block, 2048 blocks per plane, and 16 planes per device.

In operation, data can be written to and/or read from a memory device of a memory system (e.g., memory devices 110-1, ..., 110-N of system 104) as a page of data. As such, a page of data can be referred to as a data transfer size of the memory system. Data can be transferred to/from a host (e.g., host 102) on a sector basis. As such, a sector of data can be referred to as a data transfer size of the host.

Although a page of data can include a number of bytes of user data (e.g., a data payload including a number of sectors of data) as well as metadata corresponding thereto, a size of a page of data often can refer only to the number of bytes used to store the user data. As an example, a page of data having a page size of 4 KB may include 4 KB used to store user data (e.g., 8 sectors assuming a sector size of 512 B) as well as a number of bytes (e.g., 32 B, 54 B, 224 B, etc.) used to store metadata corresponding to the user data. The metadata can include integrity data such as error data (e.g., error detecting and/or correcting code data) and/or address data (e.g., logical address data), among other metadata corresponding to the user data.

Different types of memory devices (e.g., devices 110-1, ..., 110-N) can provide different page sizes and/or may have different amounts of metadata bytes available in association with a stored page. Also, different memory device types can have different bit error rates, which can lead to different amounts of metadata necessary to ensure integrity of the page of data (e.g., a memory device with a higher bit error rate may require more bytes of error correction code data than a memory device with a lower bit error rate). As an example, a multi-level cell (MLC) NAND flash device may have a higher bit error rate than a single level cell (SLC) NAND flash device. As such, the MLC device may use more metadata bytes for error data than the SLC device. In some instances, the amount of metadata necessary to provide a desired integrity of a page of data may exceed the metadata bytes provided by a memory device. That is, the available amount of metadata bytes may be less than the amount desirable to provide adequate end-to-end data integrity of the sectors (e.g., user data) corresponding to the page.

Figure 2:
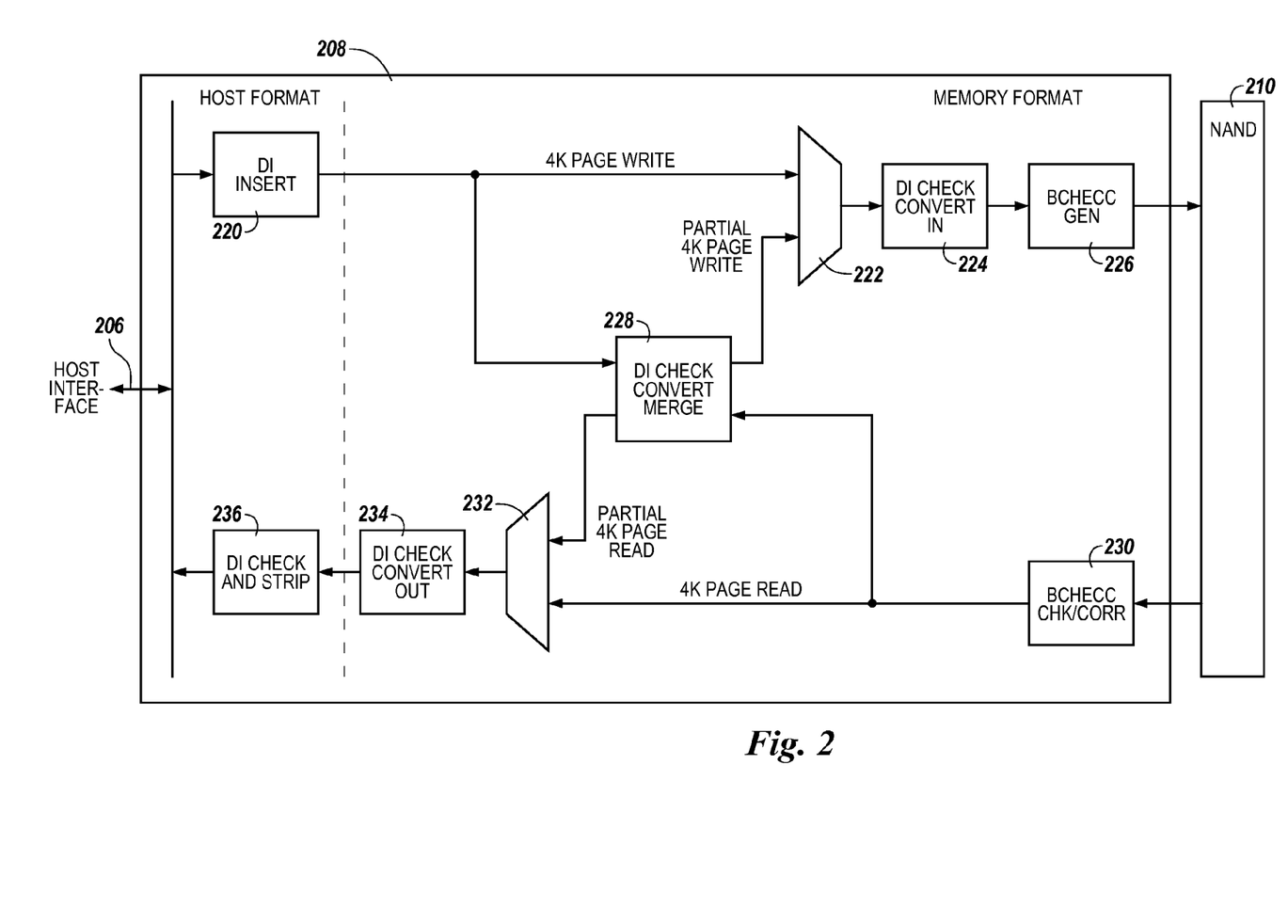
FIG. 2 is a functional block diagram of a memory controller associated with providing integrity of transferred data in accordance with one or more embodiments of the present disclosure.

FIG. 2 is a functional block diagram of a memory controller 208 associated with providing integrity of transferred data in accordance with one or more embodiments of the present disclosure. The controller 208 can be a component of a memory system such as memory system 104 illustrated in FIG. 1. It will be appreciated by one of ordinary skill in the art that additional circuitry and components can be provided beyond those illustrated in FIG. 2, and that the detail of FIG. 2 has been reduced to facilitate ease of illustration. Embodiments are not limited to the example illustrated in FIG. 2. For instance, one or more of the illustrated components of controller 208 can be integrated as a single component. Also, one or more of the illustrated components can be optional in a number of embodiments of the present disclosure.

As shown in FIG. 2, memory controller 208 includes control circuitry used to transfer data between a host interface 206 and a number of memory devices 210. The memory devices 210 can be memory devices such as memory devices 110-1, . . . , 110-N illustrated in FIG. 1.

In a number of embodiments, the control circuitry is configured to adjust (e.g., change) a metadata format between a first format and a second format to provide integrity of the data transferred between the host interface 206 and the number of memory devices 210. As an example, a first metadata format can include integrity data on a per sector basis and a second metadata format can include integrity data on a multi-sector basis. As described further below, providing integrity of the transferred data can include: performing a check of first integrity data (e.g., error data and/or address data) of metadata having a first format (e.g., metadata 341 shown in FIG. 3) and corresponding to a number of sectors (e.g., a sector located in data field 348 shown in FIG. 3) received from a host (e.g., in connection with a write request from the host); generating second integrity data (e.g., integrity data 454-0/454-1 shown in FIG. 4 and/or 552/554 shown in FIG. 5) of second metadata (e.g., metadata 447 shown in FIG. 4 and/or metadata 547-0/547-1 shown in FIG. 5), the second integrity data corresponding to at least one of the number of sectors; and generating third integrity data (e.g., integrity data 458 shown in FIG. 4 and/or 558-0/558-1 shown in FIG. 5) of the second metadata. The third integrity data includes error data corresponding to the second integrity data as well as the at least one of the number of sectors.

The controller 208 can write a number of sectors of data (e.g., user data) received from the host (e.g., responsive to a write request from the host) as a page. In various instances, the number of sectors received by the controller 208 may be fewer than the number of sectors corresponding to a page size of the number of memory devices 210. In such instances, the controller 208 can perform a partial page write operation, which can include, for example, forming a merged page by merging the sectors received from the host with sectors of a page read from the memory device 210 (e.g., by replacing sectors of the read page with the sectors received from the host), and then writing the merged page to the memory device 210. Similarly, the controller 208 can perform a partial page read operation (e.g., in response to a host read request for a number of sectors that is less than the number of sectors corresponding to the page size of the memory device 210). A partial page read operation can include reading a page of data from the memory device 210 and providing only those data sectors requested to the host. As described further below, embodiments of the present disclosure can provide integrity of transferred data in association with such partial page write and/or read operations.

Figure 3:
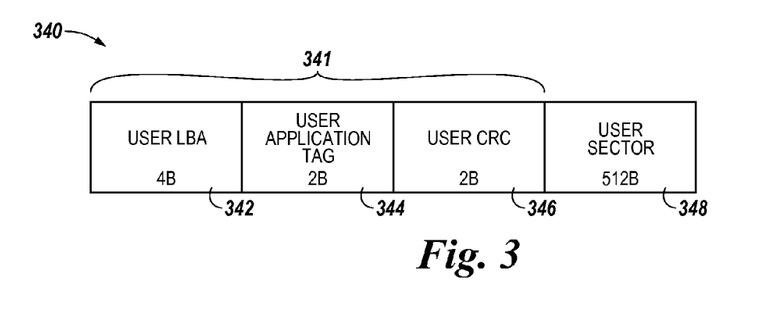
FIG. 3 illustrates a metadata format associated with providing integrity of transferred data in accordance with one or more embodiments of the present disclosure.

As illustrated in FIG. 2, the controller 208 can include a data integrity (DI) insertion component 220. The component 220 can append metadata having a particular metadata format to sectors of data received from a host. The particular metadata format can be referred to as a host format. An example host metadata format is illustrated in FIG. 3, which illustrates a sector of user data located in data field 348 (which may be referred to as sector field 348) and having metadata 341 appended thereto. In the example shown in FIG. 3, the size of the sector field 348 is 512 B (e.g., the sector size is 512 B) and metadata 341 is an 8 B data integrity field (DIF) including subfields 342, 344, and 346 providing integrity data associated with the sector corresponding to sector field 348. Embodiments are not limited to this example. For instance, the size of sector field 348 can be larger or smaller than 512 B and the size of metadata field 341 can be larger or smaller than 8 B. As one example, a host sector size may be 4096 B such that size of data field 348 is 4096 bytes and the size of metadata field 341 can be 128 B (e.g., each host sector can have 128 B of metadata associated therewith). In the example illustrated, field 346 includes error data corresponding to the sector of user data corresponding to sector field 348. In this example, the error data of field 346 is a 2 B cyclic redundancy check (CRC) corresponding to the sector corresponding to sector field 348. Field 344 is a 2 B application tag that can include further integrity data, and field 342 is a 4 B reference field that can include address data associated with the sector corresponding to sector field 348.

In a number of embodiments, metadata 341 is appended to each sector of user data received from the host (e.g., the integrity data of metadata 341 is on a per sector basis). As an example, component 220 can calculate error data 346 for each sector on a per sector basis. Each of a number of sectors and corresponding metadata 341 (e.g., each of a number of data groups 340) can be transferred to an integrity component 224 of controller 208 (e.g., via a data buffer 222 in association with a write operation). In a number of embodiments, the metadata 341 associated with each data group 340 can originate from the host interface 206 and component 220 can be used to insert additional integrity data such as that illustrated in FIG. 4 (e.g., 452, 454-0, 454-1, etc.). In a number of embodiments, the data associated with fields 342, 344, and 346 of metadata 341 can be appended to the sectors of data (e.g., using component 220) received from a host or the metadata 341 can be appended to the sectors of data prior to being received by controller 208.

In the example illustrated in FIG. 2, the controller 208 includes a merge component 228 to which the data groups 340 can be transferred, prior to being transferred to integrity component 224 (e.g., if the number of sectors is less than the number of sectors corresponding to a full page such that the write operation is a partial page write operation). In the example illustrated in FIG. 2, a page size associated with memory devices 210 is 4 KB (e.g., eight 512 B sectors).

The merge component 228 can, in association with a partial page write operation, receive a second number of sectors (e.g., eight sectors) corresponding to a page of data from the number of memory devices 210. The second number of sectors can include metadata corresponding thereto in accordance with a second format (e.g., a format associated with the memory device 210 and which can be referred to herein as a memory metadata format or an adjusted format). Example adjusted formats are described further below in connection with FIGS. 4 and 5. In a number of embodiments, the merge component 228 can form a merged page by replacing at least one of the second number of sectors corresponding to the page of data received from the memory devices 210 with at least one of the first number of sectors received from the host (e.g., sectors corresponding to sector field 348). The merge component 228 can also change a metadata format associated with the sectors of the merged page from the adjusted format to the host format prior to providing the sectors of the merged page to the integrity component 224. In a number of embodiments, the merge component 228 is configured to perform a check of error data of the metadata corresponding to the second number of sectors (e.g., a CRC check) prior to replacing the at least one of the second number of sectors corresponding to the page of data with the at least one of the first number of sectors corresponding to sector field 348.

The integrity component 224 is configured to perform a check of integrity data of the first metadata 341 corresponding to the number of sectors to be written to device 210 as a page. For instance, the integrity component 224 can, for each of the sectors, calculate error data (e.g., a CRC) and compare it to the error data 346 of metadata 341, which can provide an indication of the integrity of the data as transferred from component 220 to component 224. The integrity component 224 can include a CRC engine and/or an error correction code (ECC) engine, among other circuitry configured to perform integrity checks of received data.

Figure 4:
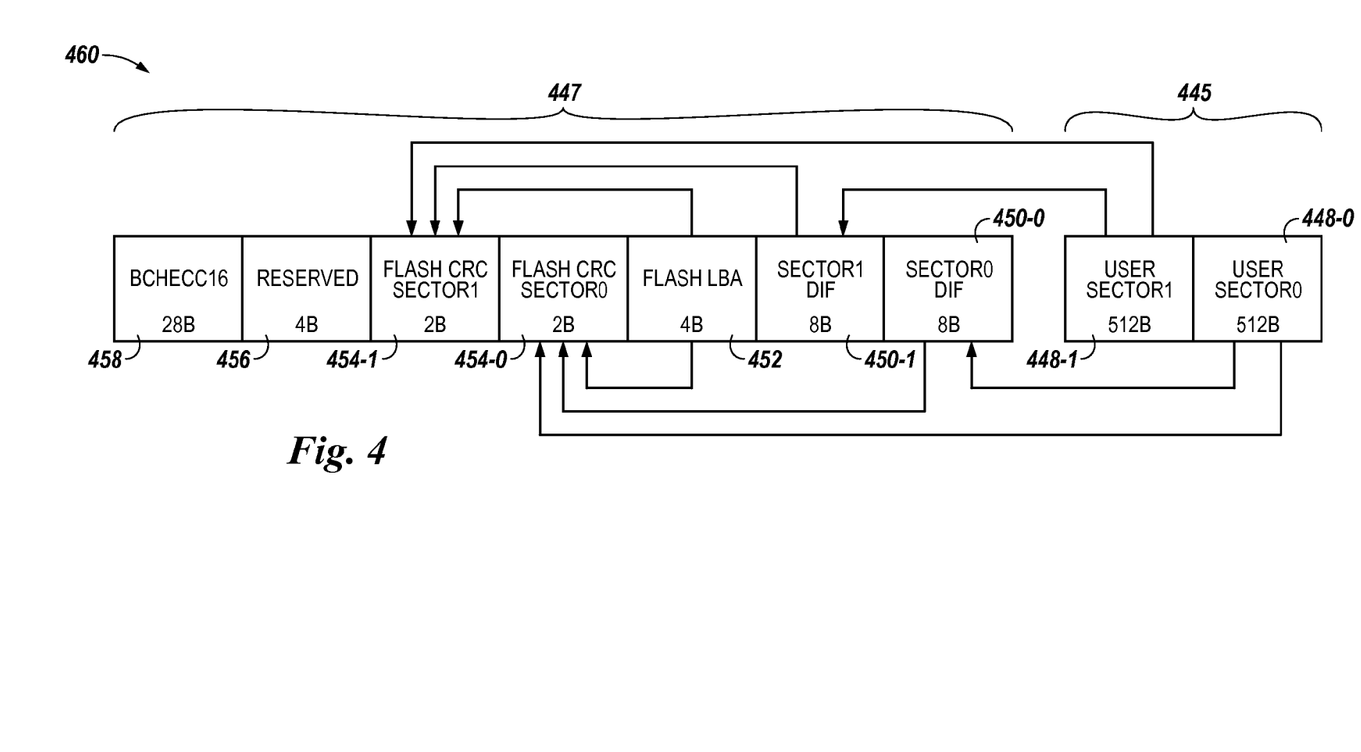
FIG. 4 illustrates a metadata format associated with providing integrity of transferred data in accordance with one or more embodiments of the present disclosure.
Figure 5:
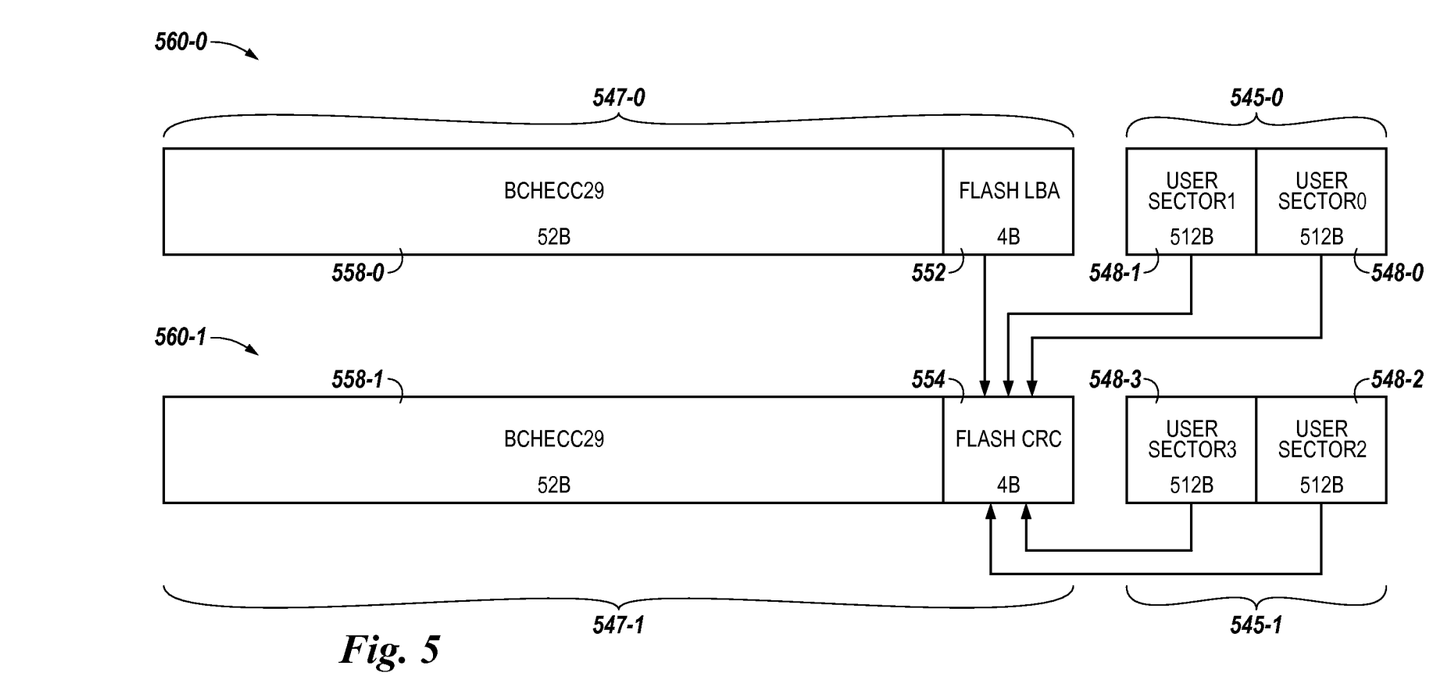
FIG. 5 illustrates a metadata format associated with providing integrity of transferred data in accordance with one or more embodiments of the present disclosure.

The integrity component 224 can also generate second metadata (e.g., metadata 447 shown in FIG. 4 and/or metadata 547-0/547-1 shown in FIG. 5) having a second metadata format (e.g., memory metadata format such as those illustrated in FIGS. 4 and 5 and associated with the memory devices 210). That is, component 224 change the metadata format associated with the first number of sectors (e.g., the number of sectors corresponding to sector field 348) to an adjusted metadata format. The second metadata format can be a format such as those illustrated in FIGS. 4 and 5 and can depend on the particular characteristics of memory device 210 (e.g., device type, error detection and/or correction characteristics, page size, and/or amount of metadata bytes available), among other characteristics. The second metadata format can include second integrity data (e.g., integrity data 454-0/454-1 shown in FIG. 4 and/or 552/554 shown in FIG. 5) corresponding to at least one of the first number of sectors. The second integrity data can include error data and/or address data in addition to, or as a replacement for, the first integrity data of the first metadata (e.g., 341). In a number of embodiments, the second metadata can also include third integrity data, which can include error data corresponding to the second integrity data as well as the at least one of the first number of sectors. For instance, the third integrity data can be an error correcting code such as a BCH error correcting code (ECC) that can cover (e.g., protect) one or more sectors of user data as well as the second integrity data corresponding thereto. The integrity component 224 can, in association with changing the metadata format associated with the user data to be written to the memory devices 210, generate the second integrity data of the second metadata.

In a number of embodiments, the controller 208 includes a component 226 configured to generate the third integrity data of the second metadata. In the example illustrated in FIG. 2, the component 226 is configured to generate the third integrity data in the form of a BCHECC code corresponding to the second integrity data of the second metadata, as well as the at least one of the number of sectors of user data. The component 226 can include an ECC engine or other component suitable for generating error data.

The controller 208 is configured to write the number of sectors and corresponding second metadata to the memory device 210 (e.g., as a page of data). As illustrated in FIG. 2, the controller 208 can include a component 230 configured to, in association with a read operation associated with one or more of the number of sectors written to the memory device, perform a check of the third integrity data associated with the second metadata corresponding to the one or more sectors (e.g., a check of the BCHECC corresponding to the one or more sectors and to the second integrity data corresponding thereto to detect the existence of erroneous data). The component 230 can also correct a number of errors (if any) associated with the one or more sectors and/or second integrity data corresponding thereto. The checked (and possibly corrected) sectors and corresponding second integrity data having the adjusted metadata format can then be provided to a second integrity component 234 of the controller 208. If the read operation is a full page read operation, the data received by component 230 can be transferred directly to the integrity component 234 via a buffer 232. If the read operation is a partial page read operation, the data received by component 230 can be transferred to the merge component 228 prior to being transferred to the integrity component 234 via buffer 232. In this example, a partial page read operation would be a read operation in which the number of 512 B sectors requested by the host is less than eight sectors since the page size is 4 KB (e.g., each full 4 KB page includes eight 512 B sectors). The component 226 can include an ECC engine or other component suitable for detecting and/or correcting errors in data.

The integrity component 234 can perform a check of the second integrity data of the second metadata corresponding to received user data sectors read from the memory devices 210. As an example, the second integrity data can include error data in the form of a CRC corresponding to one or more sectors. The integrity component 234 can generate a CRC for the one or more sectors that can be compared to the CRC of the second integrity data (e.g., second integrity data which was previously generated by integrity component 224 and inserted in the second metadata prior to the one or more sectors being written to memory devices 210). As described further below, the second integrity information can include error data (e.g., a CRC) on a multi-sector basis.

The integrity component 234 can also adjust (e.g., convert) the metadata format associated with the sectors read from the memory devices 210 from the adjusted metadata format back to the host format (e.g., the format shown in FIG. 3). Converting the adjusted metadata format back to the host format can include replacing the second metadata corresponding to the number of sectors read from the memory devices 210 with third metadata. The third metadata can include fourth integrity data, such as error data (e.g., a CRC) corresponding to the number of sectors, which the integrity component can generate on a per sector basis. The third metadata can have a format such as that associated with metadata 341 such that the fourth integrity data can be calculated and included in a data field such as field 346 illustrated in FIG. 3.

In a number of embodiments, the second integrity component 234 can provide the number of sectors having the host format to a component 236, which can perform a check of the fourth integrity data (e.g., the CRC generated by component 234) corresponding to the number of sectors prior to providing the requested number of sectors to the host. In this manner, the integrity of the data received from the host (e.g., as a number of sectors corresponding to sector field 348) and written to the memory devices 210 can be confirmed in association with a read request associated with providing the number of sectors back to the host. In a number of embodiments, the component 236 can remove (e.g., strip) the metadata corresponding to the sectors received thereto prior to providing the sectors associated with the read request back to the host via the host interface 206. However, embodiments are not so limited. For instance, in a number of embodiments, one or more portions of the metadata (e.g., integrity data) corresponding to the host format (e.g., the format shown in FIG. 3) and received by component 236 can be sent to the host (e.g., via host interface 206) without being removed. The unremoved integrity data may be rechecked by the host interface 206 or by the host itself (e.g., at the application level).

The controller 208 illustrated in FIG. 2 can adjust a metadata format associated with a number of sectors between different formats while maintaining the ability to provide data integrity associated with the number of sectors as well as the metadata corresponding thereto. As described further below, the adjusted metadata format can depend on the type of memory device (e.g., memory device 210) to which the sectors will be written to and/or read from.

In a number of embodiments, data stored in the memory devices 210 (e.g., in accordance with an adjusted metadata format such as that illustrated in FIGS. 4 and 5) can be transferred to/from the memory devices 210 in association with operations (e.g., read and/or write operations) that do not originate from a host. For instance, a memory management component (e.g., 613 shown in FIG. 6) associated with controller 208 can write data to and/or read data from the memory devices 210 in association with a data reclamation process. In such instances, components such as integrity component 224 and/or merge component 228 may check the integrity data associated with the adjusted metadata format (e.g., instead of first converting the metadata from the adjusted metadata format back to the host format and then checking the integrity data associated with the host format.

FIG. 4 illustrates a metadata format associated with providing integrity of transferred data in accordance with one or more embodiments of the present disclosure. The metadata format illustrated in FIG. 4 is a metadata format associated with a particular memory device (e.g., memory device 210 shown in FIG. 2). As one example, the metadata format illustrated in FIG. 4 can be associated with an SLC NAND memory device.

The metadata format illustrated in FIG. 4 is an adjusted metadata format as compared to the host metadata format illustrated in FIG. 3, for example. FIG. 4 illustrates a data group 460 that can be formed, for instance, by integrity component 224 of controller 208 described above in connection with FIG. 2. The data group 460 can be one of multiple data groups that each include at least one of a number of sectors received from a host in connection with a write operation, for example, along with metadata corresponding thereto. The data group 460 can be referred to herein as a codeword 460.

In the example illustrated in FIG. 4, the codeword 460 includes a payload portion 445, which includes two sector data fields 448-0 and 448-1. In this example, the codeword 460 includes two 512 B sectors (e.g., USER SECTOR0 corresponding to field 448-0 and USER SECTOR1 corresponding to field 448-1), as well as metadata 447. Although not illustrated in FIG. 4, the reader will appreciate that a 4 KB page of data can include four codewords 460 (e.g., with a first additional codeword 460 including a third and fourth user sector, a second additional codeword 460 including a fifth and sixth user sector, and a third additional codeword 460 including a seventh and eighth user sector, along with respective corresponding metadata 447). In this example, the metadata 447 includes 56 B of data. As such, each codeword 460 includes a 1 KB payload (e.g., two 512 B sectors) and 56 B of available metadata. Therefore, writing a page of data to the memory devices can include writing 4320 B of data (e.g., 4 KB of user data corresponding to a 4 KB page size, as well as 320 B of metadata).

The metadata 447 associated with codeword 460 includes a number of data fields. The arrows illustrated in FIG. 4 are used to indicate which portions of data are covered by particular integrity data fields. In this example, field 450-0 is an integrity data field that includes the 8 B DIF data associated with the user sector of field 448-0 (e.g., SECTOR0 DIF). That is, field 450-0 can include the metadata (e.g., 341), which was appended to SECTOR0 (e.g., via insertion component 220 shown in FIG. 2) prior to SECTOR0 being provided to the integrity component 224. Similarly, field 450-1 is an integrity data field that includes the 8 B DIF data associated with the user sector of field 448-1 (e.g., SECTOR1 DIF). That is, field 450-1 can include the metadata (e.g., 341), which was appended to SECTOR1 (e.g., via insertion component 220 shown in FIG. 2) prior to SECTOR1 being provided to the integrity component 224.

Data field 452 of metadata 447 is a 4 B data integrity field that includes address data associated with a page of data to which codeword 460 corresponds. The address data (shown as FLASH LBA) can be a logical block address (LBA) associated with the logical page of data to which the user data sectors of fields 448-0 and 448-1 correspond. The field 452 of different codewords 460 corresponding to the same page can be checked to determine whether the integrity of the address data is maintained across the number of codewords corresponding to the page.

Data field 454-0 of metadata 447 is a 2 B error data field. In this example, the error data corresponding to field 454-0 (shown as FLASH CRC SECTOR0) is a CRC covering the data corresponding to fields 448-0, 450-0, and 452 (e.g., a CRC covering the 512 B of USER SECTOR0, the 8 B SECTOR0 DIF, and the 4 B FLASH LBA of the page to which SECTOR0 corresponds). Similarly, data field 454-1 of metadata 447 is a 2 B error data field. In this example, the error data corresponding to field 454-1 (shown as FLASH CRC SECTOR1) is a CRC covering the data corresponding to fields 448-1, 450-1, and 452 (e.g., a CRC covering the 512 B of USER SECTOR1, the 8 B SECTOR1 DIF, and the 4 B FLASH LBA of the page to which SECTOR1 corresponds). The data fields 452, 454-0, and 454-1 of the adjusted metadata format illustrated in FIG. 4 can include data referred to as second integrity data as described above in connection with FIG. 2.

Data field 456 of metadata 447 is a 4 B reserved data field, in this example. The field 456 may be used for various purposes in association with data transfer within a memory system (e.g., memory system 104 shown in FIG. 1). For instance, the field 456 can include additional error data and/or other integrity data associated with payload 445. However, the field 456 may be used for purposes other than data integrity.

Data field 458 of metadata 447 is a 28 B error data field. In this example, the error data corresponding to field 458 (shown as BCHECC16) is a 16 bit error correcting code (ECC) covering the 1024 B of user data corresponding to payload 445 (e.g., USER SECTOR0 and USER SECTOR1) as well as the 56 B of metadata 447 associated therewith. As such, the error data corresponding to field 458 supports 16 bit correction per codeword 460 (e.g., per 1080 B). Embodiments are not limited this example. The data field 458 of the adjusted metadata format illustrated in FIG. 4 can be referred to as third integrity data as described above in connection with FIG. 2.

The adjusted metadata format illustrated in FIG. 4 can be implemented via a controller and can be used to provide data integrity in association with operations such as write and read requests from a host as described above in connection with FIG. 2. For instance, the integrity component 224 can convert a metadata format associated with sectors received from a host from a first format (e.g., a host format such as that shown in FIG. 3) to a second format (e.g., an adjusted format such as that shown in FIG. 4). Codewords (e.g., 460) written to the memory devices 210 can include an error data field (e.g., 458) that includes error data generated by component 226 that covers the other metadata (e.g., the data of metadata 447 corresponding to data fields other than field 458) and payload (e.g., 445) of the codewords. The error data covering the other metadata and payload can be checked via component 230 when the codewords are read from the memory devices 210 (e.g., in response to a read request from a host). Whether the read request is a partial page read request or a full page read request, the controller 208 is configured to convert the metadata format associated with the codewords read from the device from the adjusted metadata format back to the host format prior to delivering the requested sectors to the host, while maintaining data integrity of the sectors of data.

FIG. 5 illustrates a metadata format associated with providing integrity of transferred data in accordance with one or more embodiments of the present disclosure. The metadata format illustrated in FIG. 5 is a metadata format associated with a particular memory device (e.g., memory device 210 shown in FIG. 2). As one example, the metadata format illustrated in FIG. 5 can be associated with an MLC NAND memory device.

The metadata format illustrated in FIG. 5 is an adjusted metadata format as compared to the host metadata format illustrated in FIG. 3, for example. FIG. 5 illustrates a first data group 560-0 and a second data group 560-1 that can be formed, for instance, by integrity component 224 and component 226 of controller 208 described above in connection with FIG. 2. The data groups 560-0 and 560-1 can be referred to as codewords 560-0 and 560-1.

In the example illustrated in FIG. 5, the codewords 560-0 and 560-1 include respective payload portions 545-0 and 545-1, as well as respective metadata 547-0 and 547-1. In this example, each of the codewords 560-0 and 560-1 include two sector data fields (e.g., codeword 560-0 includes sector fields 548-0 and 548-1 and codeword 560-1 includes sector fields 548-2 and 548-3). The codeword 560-0 includes two 512 B sectors (e.g., USER SECTOR0 corresponding to field 548-0 and USER SECTOR1 corresponding to field 548-1). The codeword 560-1 includes two 512 B sectors (e.g., USER SECTOR2 corresponding to field 548-2 and USER SECTOR3 corresponding to field 548-3). Although not illustrated in FIG. 5, the reader will appreciate that a 4 KB page of data can include four codewords (e.g., an additional codeword 560-0 including a fifth and sixth user sector and an additional codeword 560-1 including a seventh and eighth user sector, along with corresponding metadata 547-0 and 547-1, respectively). In this example, the metadata 547-0/547-1 includes 56 B of data. As such, each codeword includes a 1024 B payload (e.g., two 512 B sectors) and 56 B of available metadata. Therefore, writing a page of data to the memory devices can include writing 4320 B of data (e.g., 4 KB of user data corresponding to a 4 KB page size, as well as 320 B of metadata).

The metadata 547-0 associated with codeword 560-0 and the metadata 547-1 associated with codeword 560-1 each include a number of data fields. In the example illustrated in FIG. 5, the adjusted metadata format is such that the data fields associated with metadata 547-0 of codeword 560-0 are different than the data fields associated with metadata 547-1 of codeword 560-1 (e.g., the 56 B of available metadata are used differently). Similar to FIG. 4, the arrows illustrated in FIG. 5 are used to indicate which portions of data are covered by particular integrity data fields.

Data field 552 of metadata 547-0 is a 4 B data integrity field that includes address data associated with a page of data to which codewords 560-0 and 560-1 correspond. The address data (shown as FLASH LBA) can be a logical block address (LBA) associated with the logical page of data to which the user data sectors of fields 548-0, 548-1, 548-2, and 548-3 correspond. The field 552 of different codewords 560-0 corresponding to the same page can be checked to determine whether the integrity of the address data is maintained across the number of codewords corresponding to the page.

Data field 554 of metadata 547-1 is a 4 B error data field. In this example, the error data corresponding to field 554 (shown as FLASH CRC) is a CRC (e.g., a 32 bit CRC) covering the data corresponding to fields 548-0, 548-1, 548-2, 548-3, and 552 (e.g., a CRC covering the 512 B of USER SECTOR0, USER SECTOR1, USER SECTOR2, and USER SECTOR3, as well as the 4 B FLASH LBA of the page to which the user sectors correspond). The data fields 552 and 554 of the adjusted metadata format illustrated in FIG. 5 can include data referred to as second integrity data as described above in connection with FIG. 2. In this example, the metadata 547-1 associated with codeword 560-1 includes second integrity data (e.g., error data in the form a CRC corresponding to data integrity field 554) corresponding to sectors associated with codeword 560-1 (e.g., USER SECTOR2 and USER SECTOR3) as wells as to sectors associated with codeword 560-0 (e.g., USER SECTOR0 and USER SECTOR1). The metadata 547-0 associated with codeword 560-0 also includes second integrity data (e.g., address data corresponding to data integrity field 552) corresponding to sectors associated with different codewords. That is, the second integrity data 552 of metadata 547-0 corresponds to sectors within the codeword 560-0 as well as to sectors within a different codeword (e.g., 560-1). As such, the adjusted metadata format associated with codewords 560-0/560-1 includes second integrity data (e.g., integrity data corresponding to fields 552 and 554) corresponding to multiple sectors (e.g., sectors 0 through 3 in this example).

Data fields 558-0 of metadata 547-0 and 558-1 of metadata 547-1 are each a 52 B error data field. In this example, the error data corresponding to fields 558-0 and 558-1 (shown as BCHECC29) is a 29 bit error correcting code (ECC) covering the 1024 B of user data corresponding to payloads 545-0 (e.g., USER SECTOR0 and USER SECTOR1) and 545-1 (e.g., USER SECTOR2 and USER SECTOR3), respectively, as well as the respective 56 B of metadata 547-0 and 547-1 associated therewith. As such, the error data corresponding to fields 558-0 and 558-1 supports 29 bit correction per codeword (e.g., per 1080 B). Embodiments are not limited this example. The data fields 558-0 and 558-1 of the adjusted metadata format illustrated in FIG. 5 can be referred to as third integrity data as described above in connection with FIG. 2.

The codewords 560-0 and 560-1 can be written to a memory device (e.g., memory device 210) along with additional codewords corresponding to the page of data. The third integrity data of metadata 547-0 and 547-1 (e.g., the ECC codes of integrity data fields 558-0 and 558-1) can be checked responsive to a read operation, for instance. The check of the third integrity data can be performed by a component such as component 230 shown in FIG. 2. In a number of embodiments, subsequent to performing the check of the third integrity data, a check of second integrity data of the metadata 547-0 and 547-1 (e.g., the CRC of data integrity field 554) can be performed (e.g., by integrity component 234). In a number of embodiments, the integrity component 234 can generate, on a per sector basis, fourth integrity data corresponding to at least one sector of a particular one of the number of codewords (e.g., USER SECTOR0 of codeword 560-0). As described above, the component 234 can replace the metadata associated with the particular one of the number of codewords (e.g., metadata 547-0 associated with codeword 560-0) with adjusted metadata (e.g., metadata having a host format such as metadata 341 shown in FIG. 3) corresponding to the at least one sector (e.g., USER SECTOR0) and including the fourth integrity data (e.g., error data such as a CRC corresponding to USER SECTOR0).

In a number of embodiments, a component such as component 236 can perform a check of the fourth integrity data of the adjusted (e.g., modified) metadata corresponding to the at least one sector of the particular one of the number of codewords. The check of the fourth integrity data can include comparing the fourth integrity data of the modified metadata corresponding to the at least one sector of the particular one of the number of codewords with first integrity data corresponding to the at least one sector. For instance, the component 236 can compare the fourth integrity data (e.g., the CRC generated by integrity component 234) with a CRC generated previously (e.g., by insertion component 220 and stored in a buffer of the controller, for example). In a number of embodiments, the adjusted metadata corresponding to the at least one sector can be removed (e.g., via component 236) prior to forwarding the at least one sector to the host. However, as indicated above, in a number of embodiments, one or more portions of the modified metadata received by the component 236 (e.g., from component 234) may be provided to the host interface 206 without being removed.

The third integrity data of metadata 547-0 and 547-1 (e.g., the ECC codes of integrity data fields 558-0 and 558-1) can also be checked responsive to a partial read operation, for instance. In such embodiments, the check of the third integrity data can be performed by a component such as component 230 shown in FIG. 2. In a number of embodiments, subsequent to performing the check of the third integrity data, a check of second integrity data of the metadata 547-0 and 547-1 (e.g., the CRC of data integrity field 554) can be performed (e.g., by merge component 228). Subsequent to checking the second integrity data of metadata 547-0 and 547-1, the merge component 228 is configured to convert the metadata from the adjusted format shown in FIG. 5 to a host format (e.g., a format including integrity data on a per sector basis as shown in FIG. 3). Merge component 228 can replace one or more of the sectors of the page read from the memory devices 210 with one or more host sectors received in association with the partial read operation, and can transfer the data and associated metadata to the integrity component 224, which is configured to receive data in accordance with the host format as described above. In a number of partial read operations, the merge component 228 may not perform a check of the second integrity data of each of the codewords corresponding to the page read from memory devices 210 (e.g., codewords 560-0 and 560-1, as well as other codewords corresponding to the read page). For instance, if the partial read includes two sectors read from the memory devices (e.g., USER SECTOR0 and USER SECTOR1) being merged with six host sectors, then the merge component 228 can check the integrity data of integrity data field 554 (e.g., the CRC corresponding to fields 548-1, 548-2, 548-3, 548-4, and 552). However, since the other codewords corresponding to the read page do not include sectors to be merged with host sectors, the merge component 228 can be configured to not perform a check of second integrity data associated with those codewords. Similarly, in association with this partial read example, the merge component 228 can be configured to forgo conversion of the metadata associated with those codewords of the read page that do not include sectors to be merged with host sectors from the adjusted format to the host format. Forgoing conversion of the metadata of those codewords not including sectors associated with the partial read operation and/or forgoing checking of second integrity data associated therewith can save processing resources, among other benefits.

Figure 6:
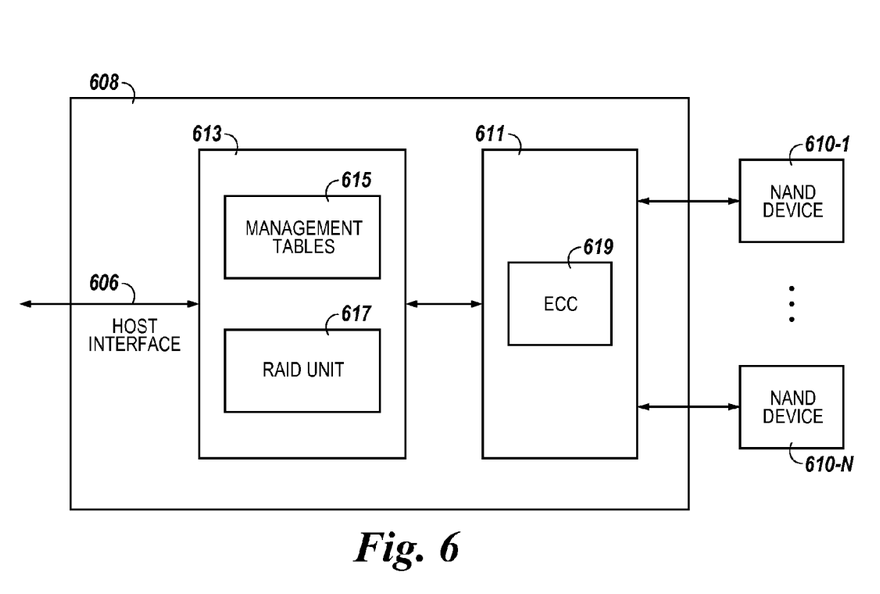
FIG. 6 is a functional block diagram of a memory controller in accordance with one or more embodiments of the present disclosure.

FIG. 6 is a functional block diagram of a memory controller 608 in accordance with one or more embodiments of the present disclosure. The controller 608 can be a controller such as controller 108 described in connection with FIG. 1 or a controller such as controller 208 described in connection with FIG. 2.

In the example illustrated in FIG. 6, the controller 608 includes a memory management component 613 and a memory control component 611. The memory management component 613 includes components (e.g., circuitry and/or firmware) associated with various memory management functions such as wear leveling (e.g., garbage collection and/or reclamation), error detection and/or correction, and/or block retirement, among various other memory management functions associated with memory devices 610-1, . . . , 610-N. The memory management component 613 can parse and/or format host commands (e.g., commands received from a host via host interface 606) into device commands (e.g., commands associated with operating the memory devices 610-1, . . . , 610-N). The memory management component 613 can also generate device commands (e.g., to accomplish various memory management functions). The memory management component 613 is configured to provide device commands to the memory control component 611.

The memory control component 611 is configured to control memory operations associated with writing data to the number of memory devices 610-1, . . . , 610-N, reading data from the memory devices 610-1, . . . , 610-N, and erasing data (e.g., blocks) within the memory devices 610-1, . . . , 610-N. The memory operations can be operations (e.g., reads and/or writes) based on host commands (e.g., host commands received to controller 608 via host interface 606) and/or can be based on internally generated device commands initiated by control component 611 and/or memory management component 613 (e.g., in association with wear leveling, error detection and/or correction, etc.).

The memory devices 610-1, . . . , 610-N coupled to control component 611 can be nonvolatile memory devices such as devices 110-1, . . . , 110-N described in FIG. 1. In the example illustrated in FIG. 6, the memory devices 610-1, . . . , 610-N are NAND flash memory devices. As described above, the memory cells within memory devices 610-1, . . . , 610-N can be organized into a number of blocks having a number of physical pages associated therewith.

The memory control component 611 includes an error correction component 619 that can include an ECC engine or other circuitry configured to detect and/or correct errors associated with data being written to and/or read from the memory devices 610-1, . . . , 610-N. In a number of embodiments, the error correction component 619 can employ a BCH ECC (e.g., such as that described above in connection with FIGS. 2, 4, and 5), to detect bit errors in data provided thereto. The detected bit errors may or may not be correctable via error correction component 619 (e.g., depending on the number of erroneous bits detected and the type of ECC used, etc.). If the number of erroneous bits is correctable via component 619, then the operation is a correctable bit error, which the component 619 can proceed to correct in association with completion of the particular operation. If the number of erroneous bits is not correctable via component 619 (e.g., the number of erroneous bits exceeds a threshold number of correctable bits associated with the component 619), then the operation is an uncorrectable bit error. The memory control component 611 can be configured to report correctable bit errors as well as uncorrectable bit errors to the memory management component 613.

The memory management component 613 includes a number of management tables 615. The tables 615 can maintain various information associated with the memory devices 610-1, . . . , 610-N. For instance, the tables 615 can include information regarding block age and/or block erase count for blocks within the devices 610-1, . . . , 610-N. The tables 615 can include information regarding error history associated with blocks and/or pages associated with the memory devices 610-1, . . . , 610-N. For instance, the tables 615 can maintain a number of error counts (e.g., a write operation error count, a read bit error count, a read operation error count, and/or an erase error count, among others) associated with the devices 610-1, . . . , 610-N. A write operation error refers to a write operation (e.g., host initiated or device initiated) which fails to perform. A read operation error refers to a read operation (e.g., host initiated or device initiated) which fails to perform. A read bit error can refer to a read operation that results in detection of a number of error bits associated with the data (e.g., page) being read. As described above, the number of detected errors may or may not be correctable via an error correction component (e.g., 619). If the number of detected errors is above a threshold number of errors correctable via the error correction component (e.g., 619), the bit error is referred to as an uncorrectable bit error. The tables 615 can maintain a count of correctable and/or uncorrectable read bit errors experienced by blocks associated with the memory devices 610-1, . . . , 610-N. The tables 615 can also include LBA tables, among others.

The memory management component 613 of controller 608 includes a redundancy management component 617, which can be a RAID (redundant array of independent disks, where the term "disks" is simply a carryover from prior implementations using hard disk drives) unit 617. The RAID unit 617 can be used to provide data reliability through redundancy in association with operating the memory devices as a RAID. The RAID unit 617 can include, for example, RAID exclusive or (XOR) circuitry, among other circuitry associated with various RAID levels.

In a number of embodiments, the controller 608 is configured to actively detect and recover from error occurrences (e.g., bit errors and/or operational errors) associated with various operations, such as read and write operations, while maintaining integrity of data transferred between the host interface 606 and memory devices 610-1, . . . , 610-N. The controller 608 is configured to remove failing memory resources (e.g., pages, blocks, and/or devices 610-1, . . . , 610-N) from use to prevent future uncorrectable errors.

For instance, the memory management component 613 can initiate erase commands to the memory control component 611 (e.g. to prepare a block within the memory devices 610-1, . . . , 610-N for writing). The control component 611 can detect the occurrence of an erase error in association with the erase operation and can report the error occurrence to the memory management component 613. In the case of an erase error, data recovery is not necessary since any valid data within the block would have been moved to a different block prior to performance of the erase operation. The block associated with the erase error can be retired when the number of erase errors reaches a threshold number. In a number of embodiments, the threshold number of erase errors is one; however, embodiments are not so limited.

In various embodiments, the controller 608 can perform various memory management functions such as wear leveling functions (e.g., garbage collection and/or reclamation), error detection/correction functions (e.g., associated with ECC), page and/or block retirement functions, and/or RAID functions, among various other memory management functions associated with memory devices 610-1, . . . , 610-N, while the controller is performing various device operations and/or host operations (e.g., read and/or write operations, etc.). As such, the various memory management functions can be performed without a perceived impact to a user. The ability of the controller 608 to perform error recovery operations while maintaining data integrity in accordance with embodiments described herein can reduce the amount of device manufacturing testing that is done (e.g., testing performed pre-shipping prior to being provided to a consumer in the field). For instance, embodiments of the present disclosure can reduce or prevent the occurrence of device manufacturing testing associated with determining location of bad blocks or bad memory devices (e.g., 610-1, . . . , 610-N), since such testing can be performed in the field via hardware components such as those component illustrated in FIG. 6 (e.g., 611, 613, 615, 617, and 619). That is, the memory devices 610-1, . . . , 610-N can be untested with respect to bad block locations associated with the memory devices 610-1, . . . , 610-N. Reducing and/or eliminating pre-shipping testing of memory devices (e.g., 610-1, . . . , 610-N) by shifting such testing to hardware components of the controller 608 can reduced costs associated with pre-shipping testing of the devices while producing little, if any, perceived impact to the user.

As an example, in connection with a host read operation, data read from the memory devices 610-1, . . . , 610-N can be checked using error correction component 619 to determine (e.g., detect) bit errors in the data. If a number of bit errors (e.g., if any) are detected and the number of bit errors is below the threshold number of bit errors correctable by the component 619 (e.g., the bit error is a correctable bit error), the data will be corrected and provided to the host. The occurrence of the correctable bit error is reported to the memory management component 613, which can maintain a bit error count (e.g., a count of correctable bit errors) associated with the block from which the data was read (e.g., in a table 615), and can retire the block if the bit error count exceeds a particular bit error count threshold. If the number of detected bit errors is above the threshold number of bit errors correctable by the component 619 (e.g., the bit error is an uncorrectable bit error), the requested read data can be automatically recovered using the RAID unit 617 and can be provided to the host. In a number of embodiments, the memory management component 613 automatically initiates the recovery of the read data responsive to a received indication of the occurrence of the uncorrectable bit error (e.g., via a report from error correction component 619). The memory management component 613 can maintain a bit error count (e.g., a count of uncorrectable bit errors) associated with the block from which the data was read (e.g., in a table 615), and can retire the block if the bit error count exceeds a particular bit error count threshold. Prior to retiring a block (e.g., in response to the bit error count exceeding the bit error count threshold) the data associated with the block can be recovered using RAID unit 617 and the data can be moved to a new block (e.g., an available good block).

Bit errors associated with a device read operation (e.g., a read operation initiated by the control component 611 is association with a memory management process such as reclamation) can be handled similarly. For instance, if a correctable bit error is detected by component 619 the data can be corrected and moved to a new block within the memory devices 610-1, . . . , 610-N (as opposed to being provided to the host in association with a host read operation). The occurrence of the correctable bit error is reported to the memory management component 613, which can maintain the bit error count associated with the block from which the data was read, and can retire the block if the bit error count exceeds a particular bit error count threshold. If the number of detected bit errors is above the threshold number of bit errors correctable by the component 619 (e.g., the bit error is an uncorrectable bit error), the requested read data can be immediately recovered using the RAID unit 617 and can be moved to a new block. The occurrence of the uncorrectable bit error is reported to the memory management component 613, which can maintain the bit error count associated with the block from which the data was read, and can retire the block if the bit error count exceeds a particular bit error count threshold. Prior to retiring a block (e.g., in response to the bit error count exceeding the bit error count threshold) the data associated with the block can be recovered using RAID unit 617 and the data can be moved to a new block (e.g., an available good block).

Operational read errors (e.g., operational host read errors and operations device read errors) can be handled in a similar manner to that described above in connection with bit errors corresponding to host and device read operations. For example, if a read request fails, an indication of the failure can be provided to memory management component 613, which can automatically initiate recovery of the requested read data (e.g., via RAID unit 617).

Operational write errors (e.g., operational host write errors and operations device write errors) can be handled in a similar manner to that described above in connection with bit errors corresponding to host and device read operations and/or with operational read errors. For example, if a write request fails, an indication of the failure can be provided to memory management component 613, which can automatically initiate recovery of the requested write data (e.g., via RAID unit 617). In a number of embodiments, the memory management component 613 automatically initiates the recovery of the write data responsive to a received indication of the occurrence of the write error (e.g., via a report from control component 611). The memory management component 613 can maintain a write error count associated with the block to which the data was to be written (e.g., in a table 615), and can retire the block if the write error count exceeds a particular write error count threshold. In connection with automatic recovery of the write data (e.g., via RAID unit 617), the recovered write data can be moved to a new block (e.g., an available good block).

CONCLUSION

The present disclosure includes apparatus (e.g., computing systems, memory systems, controllers, etc.) and methods for providing data integrity. One or more method embodiments can include, for example: receiving a number of sectors of data to be written to a number of memory devices (e.g., a single memory device); appending first metadata corresponding to the number of sectors and including first integrity data to the number of sectors, the first metadata has a particular format; generating second integrity data to be provided in second metadata, the second integrity data corresponding to at least one of the number of sectors (wherein the second metadata has a second format); and generating third integrity data to be provided in the second metadata, the third integrity data including error data corresponding to the second integrity data and the at least one of the number of sectors.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. As used herein, the term "and/or" includes any and all combinations of one or more of the associated listed items.

As used herein, the term "and/or" includes any and all combinations of one or more of the associated listed items. As used herein the term "or," unless otherwise noted, means logically inclusive or. That is, "A or B" can include (only A), (only B), or (both A and B). In other words, "A or B" can mean "A and/or B" or "one or more of A and B."

It will be understood that, although the terms first, second, third, etc. may be used herein to describe various elements, these elements should not be limited by these terms. These terms are only used to distinguish one element from another element. Thus, a first element could be termed a second element without departing from the teachings of the present disclosure.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising a controller configured to be coupled to a number of memory devices, the controller being configured to:
    receive a number of sectors of data to be written to the number of memory devices;
    append first metadata corresponding to the number of sectors and including first integrity data to the number of sectors, wherein the first metadata has a first format;
    generate second integrity data to be provided in second metadata having a second format, the second integrity data corresponding to at least one of the number of sectors; and
    generate third integrity data to be provided in the second metadata, the third integrity data including error data corresponding to the second integrity data and the at least one of the number of sectors.

2. The apparatus of claim 1, wherein the controller is configured to perform a check of the first integrity data prior to generating the second integrity data.

3. The apparatus of claim 1, wherein:
    the first integrity data of the first metadata corresponding to the number of sectors to be written to the memory devices includes error data on a per sector basis; and wherein the second integrity data of the second metadata corresponding to the at least one of the number of sectors includes error data on a multi-sector basis.

4. The apparatus of claim 1, wherein the controller is configured to write the number of sectors and corresponding second metadata having the second format to the number of memory devices, and wherein the controller is further configured to:
receive the number of sectors and corresponding second metadata from the number of memory devices in association with a read operation;
perform a check of the error data of the third integrity data;
subsequently perform a check of at least one of error data and address data of the second integrity data; and
adjust the metadata format associated with the number of sectors from the second format back to the first format prior to providing the number of sectors to a host.

5. The apparatus of claim 4, wherein the controller being configured to adjust the metadata format associated with the number of sectors from the second format back to the first format prior to providing the number of sectors to the host comprises the controller being configured to:
generate error data on a per sector basis for the number of sectors; and
perform a check of the error data of each sector prior to providing the number of sectors to the host.

6. The apparatus of claim 1, wherein the controller being configured to append the first metadata comprises the controller being configured to generate error data of the first integrity data on a per sector basis and insert the error data into the first metadata prior to generating the second integrity data in association with a write operation.

7. The apparatus of claim 1, wherein the number of sectors of data comprises a first number of sectors of data and wherein the controller is further configured to, in association with a partial page write operation:
receive a second number of sectors corresponding to a page of data from the number of memory devices, the second number of sectors being associated with metadata corresponding thereto and having the second format;
adjust a metadata format associated with the sectors of the page from the number of memory devices from the second format to the first format; and
form a merged page by replacing at least one of the second number of sectors corresponding to the page of data with at least one of the first number of sectors.

8. The apparatus of claim 7, wherein the controller is configured to perform a check of error data of the metadata corresponding to the second number of sectors prior to replacing the at least one of the second number of sectors corresponding to the page of data with the at least one of the first number of sectors.

9. The apparatus of claim 1, wherein the number of sectors comprises a first number of sectors and wherein the controller is configured to write the first number of sectors and corresponding second metadata having the second format to the number of memory devices as a page of data, and wherein the controller is further configured to, in association with a partial page read operation:
receive a second number of sectors corresponding to a page of data from the number of memory devices, the second number of sectors being associated with metadata corresponding thereto and having the second format;
perform a check of error data of the metadata corresponding to a selected one or more of the second number of sectors associated with the partial page read operation;
adjust the metadata format associated with the selected one or more of the second number of sectors to the first format such that the metadata corresponding to the selected sectors include integrity data on a per sector basis; and
perform a check of the integrity data corresponding to the selected sectors prior to providing the selected sectors of the partial page to a host.

10. The apparatus of claim 9, wherein the controller is further configured to, in association with the partial page read operation, perform a check of integrity data of the metadata corresponding the selected sectors received from the number of memory devices prior to performing the check of the integrity data corresponding to the selected sectors.

11. The apparatus of claim 1, wherein the controller comprises a solid state drive memory controller and the number of memory devices comprise a number of solid state memory devices.

12. A method for providing data integrity, comprising:
receiving a number of sectors of data to be written to a number of memory devices, the number of sectors having first metadata including first integrity data associated therewith, wherein the first metadata has a particular metadata format;
generating second integrity data to be provided in second metadata having an adjusted metadata format, the second integrity data corresponding to at least one of the number of sectors; and
generating third integrity data to be provided in the second metadata, the third integrity data including error data corresponding to the second integrity data and the at least one of the number of sectors.

13. The method of claim 12, wherein the particular metadata format includes the first integrity data on a per sector basis and the adjusted metadata format includes the second integrity data on a multi-sector basis.

14. The method of claim 12, further comprising replacing the first metadata with the second metadata.

15. The method of claim 12, wherein the second metadata includes the first integrity data.

16. The method of claim 12, wherein the second metadata does not include the first integrity data.

17. The method of claim 12, including writing the number of sectors and corresponding second metadata to the memory device.

18. The method of claim 17, wherein the method includes, in association with a read operation associated with one or more of the number of sectors written to the memory device, performing a check of the third integrity data provided in the second metadata corresponding to the one or more sectors.

19. The method of claim 18, wherein the method includes, in association with the read operation associated with one or more of the number of sectors written to the memory device:
subsequent to the check of the third integrity data, performing a check of the second integrity data including error data corresponding to the one or more of the number of sectors; and
adjusting the adjusted metadata format associated with the one or more of the number of sectors back to the particular metadata format.

20. The method of claim 19, wherein adjusting the adjusted metadata format associated with the one or more of the number of sectors back to the particular metadata format includes replacing the second metadata with third metadata, the third metadata including fourth integrity data corresponding to the one or more of the number of sectors on a per sector basis.

21. The method of claim 20, wherein the method includes comparing the fourth integrity data corresponding to the one or more of the number of sectors with the first integrity data corresponding to the one or more of the number of sectors prior to providing the one or more of the number of sectors to a host.

22. The method of claim 12, wherein the method includes:
prior to generating the second integrity data, reading a page from the memory device, the page including multiple sectors and corresponding metadata having the adjusted metadata format;
performing a check of integrity data associated with the page;
adjusting the adjusted metadata format associated with the multiple sectors to the particular metadata format; and
forming a write page by replacing one or more of the multiple sectors associated with the read page with one or more of the received number of sectors prior to writing the write page to the memory device.

23. The method of claim 12, including appending the first integrity data of the first metadata to the number of sectors using a controller coupled to the number of memory devices.

24. A method for providing data integrity, comprising:
receiving a number of sectors of data to be written to a memory device as at least part of a page of data, wherein each of the number of sectors have first integrity data associated therewith;
forming a number of groups of data associated with the page, with each of the number of groups including at least one of the number of sectors and metadata corresponding thereto, wherein:
the metadata associated with at least one of the number of groups includes second integrity data corresponding to the at least one of the number of sectors of the at least one of the number of groups as well as at least one sector of the number of sectors of at least one different group of the number of groups; and
the metadata associated with each of the number of groups includes third integrity data corresponding to the at least one of the number of sectors of the respective at least one of the number of groups as well as the second integrity data corresponding to the respective group itself.

25. The method of claim 24, wherein the method includes:
writing the number of groups to the memory device; and
performing a check of the third integrity data of the metadata associated with a particular one of the number of groups responsive to a read operation associated with the at least one sector of the particular one of the number of groups.

26. The method of claim 25, wherein the method includes, subsequent to performing the check of the third integrity data of the metadata associated with the particular one of the number of groups:
performing a check of the second integrity data of the metadata associated with the particular one of the number of groups;
generating, on a per sector basis, fourth integrity data corresponding to the at least one sector of the particular one of the number of groups; and
replacing the metadata associated with the particular one of the number of groups with adjusted metadata corresponding to the at least one sector of the particular one of the number of groups, the adjusted metadata including the fourth integrity data.

27. The method of claim 26, wherein the method includes performing a check of the fourth integrity data of the adjusted metadata corresponding to the at least one sector of the particular one of the number of groups.

28. The method of claim 27, wherein performing the check of the fourth integrity data includes comparing the fourth integrity data of the adjusted metadata corresponding to the at least one sector of the particular one of the number of groups with the first integrity data corresponding to the at least one sector.

29. The method of claim 28, wherein the method includes removing the adjusted metadata corresponding to the at least one sector prior to providing the at least one sector to a host.

30. The method of claim 24, wherein the first integrity data includes address integrity data and error data corresponding to each of the respective sectors, and wherein the method further comprises performing a check of the address integrity data and the error data for each of the number of sectors.

* * * * *